Oct. 31, 1967
H. GREEN
3,349,452
ONE-WAY RELEASABLE SNAP FASTENER CONNECTION FOR WEBBING MATERIAL
Filed Sept. 21, 1966
2 Sheets-Sheet 1
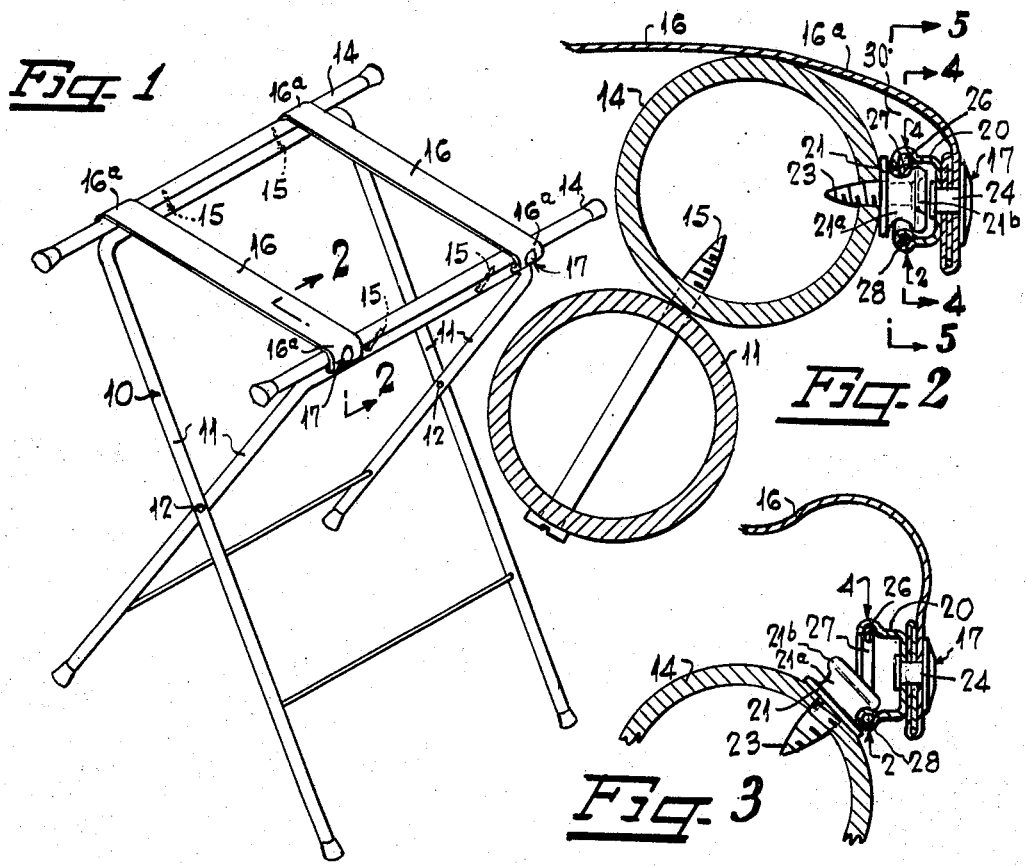
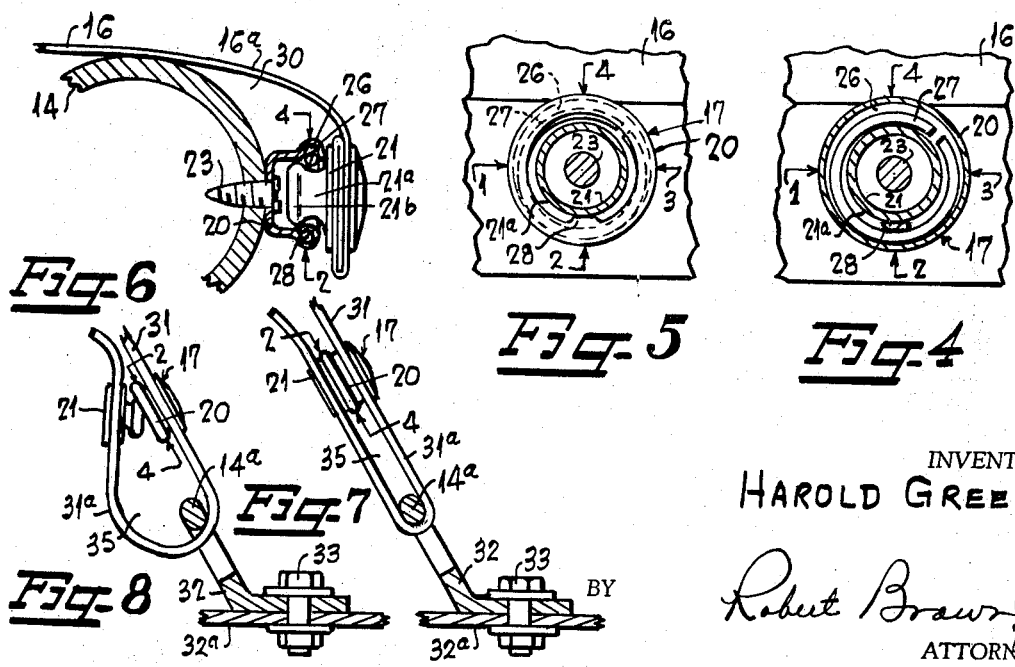
INVENTOR:
HAROLD GREEN
BY Robert Brown Jr.
ATTORNEY

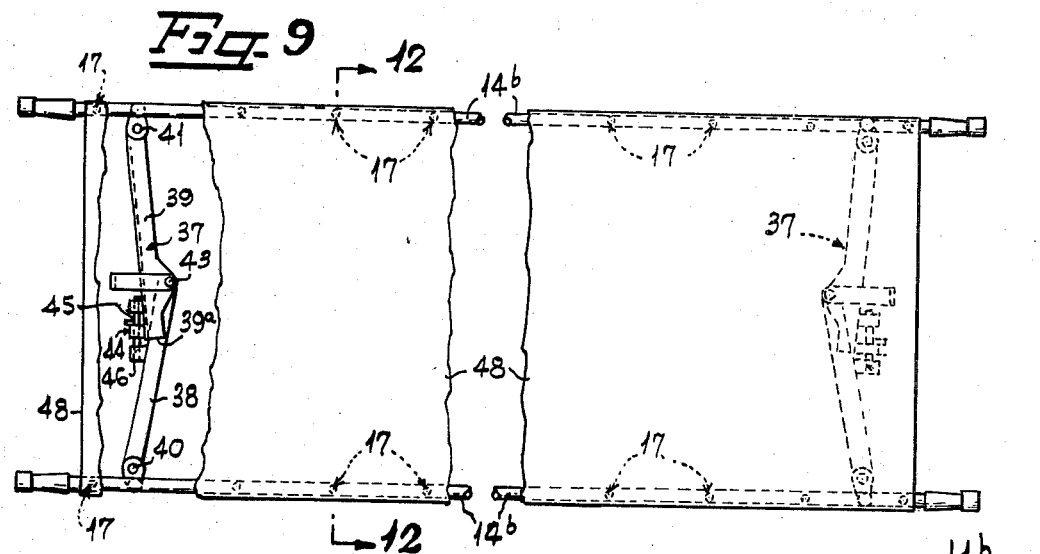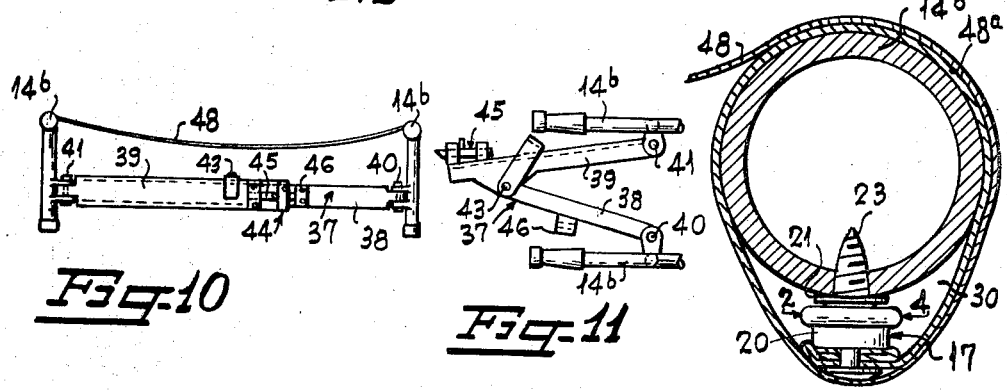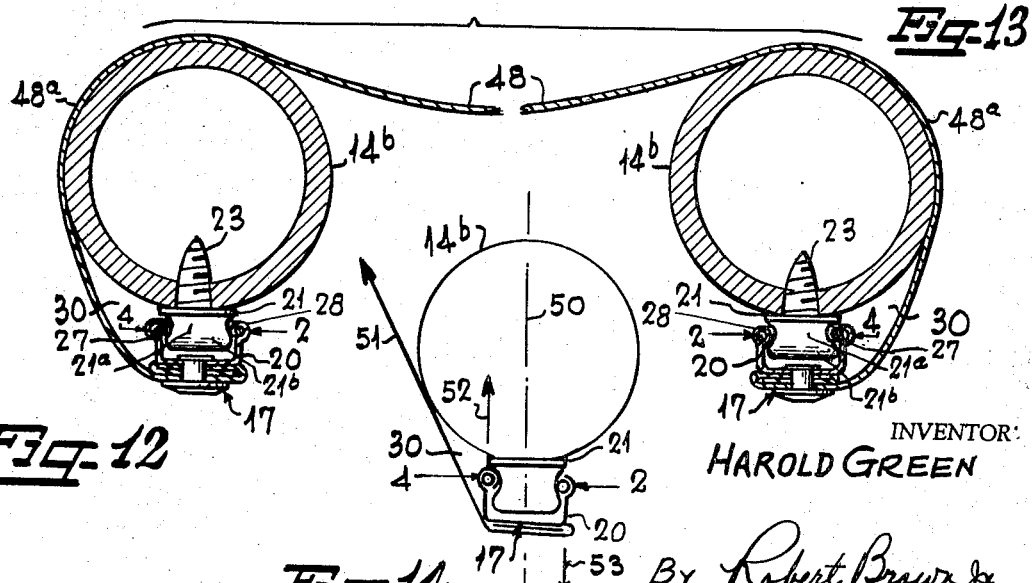

United States Patent Office 3,349,452
Patented Oct. 31, 1967

3,349,452
ONE-WAY RELEASABLE SNAP FASTENER
CONNECTION FOR WEBBING MATERIAL
Harold Green, 3915 N. 31st Ave.,
Phoenix, Ariz. 85017
Filed Sept. 21, 1966, Ser. No. 580,972
7 Claims. (Cl. 24—218)

ABSTRACT OF THE DISCLOSURE

A connection employing a one-side releasable snap fastener for detachably securing a flexible cover to an elongated transversely disposed support, wherein the releasable fastener side is normally shielded from external access transversely of the support.

---

This invention is a continuation-in-part of my copending patent application Serial No. 444,775, filed April 1, 1965 and relates to a snap fastener connection employed for attaching webbing to an elongated support such as the framework of waiter tray stands, litters, stretchers, seat belts, laundry carts, lawn furniture and the like.

Snap fasteners are employed primarily for the purpose of quickly attaching or detaching two or more parts of an assembly. Early types of fasteners were separable in response to an axial pull applied at any point of its periphery and are now in common usage. More recently, the earlier type was modified for use on certain installations to limit the detachability to a pull at one point or side of the fastener while providing locking means at the remaining sides. Examples of the three-side lock snap fasteners are disclosed in U.S. Patents Nos. 2,328,016 and 2,467,315. Although the latter type of fastener partially alleviates the problem of accidental detachment, the problem continues to remain with respect to the fourth side where the pull is exerted to deliberately separate the fastener components.

It is therefore an object of this invention to provide a connection employing a one-side releasable snap fastener for detachably securing a flexible webbing or strap to an elongated transversely disposed support wherein the tension applied to the webbing during use will produce a component of force resisting detachment at said releasable side of the fastener.

It is another object of the invention to provide a snap fastener connection of the type described in which said releasable fastener side and surfaces of the webbing and the support form the inner wall surface of a hollow shield extending alongside the support to thereby conceal the releasable fastener side and prevent external access thereto transversely of the support.

Specifically, the invention comprises a connection in which a load-supporting flexible webbing is secured to a transverse support, such as a frame or bar, by means of a snap fastener normally held in locked position on three sides and separable upon application of axial pull at its fourth side, and wherein the fourth side is normally concealed by continuous complementary segments of the support and the webbing and a locked fastener side.

Some of the objects of the invention having been stated, other objects will appear as the description proceeds when taken in connection with the accompanying drawings in which, FIGURE 1 is an isometric view of a waiter tray stand embodying the present invention;

FIGURE 2 is an enlarged sectional view taken along line 2—2 in FIGURE 1;

FIGURE 3 is an enlarged sectional view similar to FIGURE 2, but showing the relative positions of the snap fastener, webbing and framework when separating the fastener;

FIGURE 4 is a sectional detail view through the snap fastener and taken along line 4—4 in FIGURE 2;

FIGURE 5 is a sectional detail view similar to FIGURE 4, but taken along line 5—5 in FIGURE 2;

FIGURE 6 is a sectional detail view similar to FIGURE 2, but showing a modified form of the invention in which the positions of the stud and socket members of the snap fastener are reversed;

FIGURE 7 is a sectional view of another modified form of invention, showing a connection of a seat belt to the floor of an automotive vehicle;

FIGURE 8 is a view similar to FIGURE 7, but showing the positions of the connecting parts when detaching the belt from the floor bracket;

FIGURE 9 is a plan view of a portion of a litter constructed in accordance with the invention;

FIGURE 10 is a view looking at the left-hand end of FIGURE 9;

FIGURE 11 is a detailed view of the left-hand end of the litter frame when in partially folded position;

FIGURE 12 is an enlarged fragmentary sectional view taken along line 12—12 in FIGURE 9;

FIGURE 13 is a cross-sectional view illustrating another modification of the invention, and FIGURE 14 is a diagrammatic view showing the directions of certain stress components of the webbing tension.

Referring more particularly to the drawings, the numeral 10 denotes a collapsible waiter tray stand comprising a pair of inverted U-shaped supports 11, 11 pivotally secured together as at 12, and a pair of parallel bars 14, 14 secured respectively to the upper portions of supports 11, 11 by any suitable means such as screws 15. A cover comprising a pair of parallel flexible webbing straps 16, 16 is disposed transversely of bars 14, 14, the opposite ends of each of said straps being secured to said bars by means of one-way releasable snap fasteners 17.

It will be observed in FIGURE 1 that the stand 10 is held in erect position by the tensioned straps 16. In order to collapse the stand, the supports 11, 11 are rotated respectively in opposite directions about pivots 12 until the bars 14, 14 contact one another thereby relieving the tension in straps 16, 16.

Each snap fastener 17 is composed of a female or socket member 20 and a male or stud member 21 axially insertable therein. Member 21 is secured to bar 14 by means of screw 23, whereas socket member 21 is secured to webbing 16 by means of a rivet 24 disposed normal to the webbing face.

Socket member 20 is cup-shaped and has a rim provided with an annular groove 26 in which a split ring 27 is eccentrically mounted as at 28, said ring being adapted to fit around restricted neck portion 21a of stud member 21 when in fastened position (FIGURES 2, 4 and 5). In fastened position, the socket member 20 is locked to the stud member along three sides 1, 2 and 3 of the fastener 17 and, therefore, separation cannot be effected by pulling at these sides. Separation may be effected, however, by exerting a pull at the fourth side 4 to cause the socket member to be rotated from the position shown in FIGURE 2 to that shown in FIGURE 3, during which the split ring 27 expands as it passes over the head portion 21b. Fasteners of the type described above are known as one-way release or three-way lock socket fasteners.

It is important to note in FIGURES 1 and 2 that the webbing 16 extends from the fourth side 4 of socket member 20, and further, that a part or segment of this extension forms a loop 16a as it passes over bar 14. The degree of bend in loop 16a will of course depend upon the point at which the fastener 17 is attached to the periphery of bar 14, but at least a slight loop mus be produced by the bar to conceal and protect said fourth side as hereinafter explained. The inside face of loop 16a and the proximate exterior surfaces of bar 14, socket member 20 and stud member 21 combine to form the interior wall surface of a hollow passageway 30 disposed transversely of the webbing extension and in which the fourth socket side 4 is hidden from view and rendered substantially inaccessible transversely of bar 14 when the stand is erected. In other words, the releasable fastener side is shielded by continuous complementary segments of the webbing and the bar, together with the exterior locked side of the snap fastener.

Access to the fourth side 4 of the fastener 17 may be obtained by collapsing stand 10 to relax the webbing tension, after which the webbing 16 is lifted as shown in FIGURE 3 to expose side 4.

FIGURE 6 shows a slightly modified form of invention which is identical to FIGURES 1 and 2 except for the reversal of the positions of fasteners members 20 and 21, that is, socket member 20 is attached to bar 14 and stud member 21 to webbing 16.

FIGURES 1, 2 and 6 show the webbing 16 secured directly to and extending partially around and secured to a transversely disposed bar 14. FIGURE 7 shows a modification in which a flexible webbing 31, such as used for seat belts, also extends partially around a transversely disposed bar portion 14a but not attached directly to said portion. Portion 14a is an integral part of a bracket 32 which, in turn, is secured to the floor 32a of a chassis by means of bolt 33. Webbing extension 31 likewise extends from said fourth fastener side 4, but is looped as at 31a around bar portion 14a, the limbs of said loop being secured together by a fastener 17 separate and apart from the bar portion. The form illustrated in FIGURE 7, however, is the same as that of FIGURES 1, 2 and 6 with reference to the manner of concealing and shielding the releasable fastener side 4.

In order to gain access to the fourth side of the fastener as shown in FIGURE 7, tension is relaxed in loop 31a to permit the latter to be expanded as shown in FIGURE 8, after which the passage 35 may be entered alongside bar 14a to separate the members 20 and 21 as previously described.

FIGURES 9 through 12 show the invention applied to a stretcher or litter where, as a safety measure, it is of vital importance to insure against accidental separation of the fasteners during use; and as a measure of economy, it is very essential to provide means for quickly detaching the webbing at other times for the purpose of replacement, repair or cleansing.

The litter frame shown is substantially the same as disclosed in U.S. Patent No. 3,040,034 and comprises a pair of parallel side bars 14b, 14b held in separated position by a pair of transversely disposed collapsible toggle spreaders 37. Spreaders 37 are shown in latched extended position in FIGURES 9 and 10 and in unlatched partially collapsed position in FIGURE 11. Specifically, each spreader 37 is composed of struts 38 and 39 pivotally secured as at 40 and 41 respectively to bars 14b, 14b, and also to one another at an intermediate point 43. In extended position, the inner end 39a of strut 39 presses against the back of strut 38, at which time, pivot point 43 is located in an off-center position with respect to a straight line containing points 40 and 41. A latch 44, consisting of a sliding bar 45 and a keeper 46, holds the spreader 37 in extended position. The release of latch 44 permits the spreader 37 to be rotated through deadcenter positon and finally to a collapsed position such as shown in FIGURE 11.

The webbing or cover employed on the litter is a rectangular sheet 48 instead of relatively narrow straps as shown in the preceding forms of invention, said sheet having socket members 20 secured at spaced points along its opposed longitudinal marginal edges. Suitable stud members are secured to the bars 14b, 14b for receiving the socket members attached to the webbing and by means of screws 23. It will be observed that the fasteners 17 are attached to the lower sides of bars 14b, 14b thereby providing a loop segment 48a with a sharper bend than in the preceding forms of invention. This location furnishes a measure of protection to the fasteners against lateral collision of the litter with other objects. Otherwise, the manner of shielding the releasable fastener sides and the construction and operation of the connections shown in FIGURES 9–12 are essentially the same as in the preceding forms.

FIGURE 13 is a detailed view identical to the right-hand portion of FIGURE 12, except the webbing 48 which extends from the fourth socket side 4 is wound approximately one and one-half times around the side bar 14b to provide added protection to the fasteners when in locked position.

In each of the above embodiments of the invention, the elongated supports or bars are shown as rigid members. It is to be understood, however, that a flexible support such as a cord or cable may be employed in many types of applicant's connection without departing from the spirit of the invention.

FIGURE 14 diagrammatically illustrates the directions of several stress components resulting from the webbing tension. The dot-dash line 50 denotes the axis of insertion of fastener 17. The tension in webbing 48 at the releasable fourth side 4 acts along line 51 and tangentially of bar 14b thereby producing an upwardly directed stress component 52 at separable side 4 and a downwardly directed stress component at the diametrically opposed locked side 2. Similarly directed stress components are produced by the web tension in the previously described forms of invention shown in FIGURES 1–6 and 9–13, and to a lesser degree in FIGURES 7 and 8.

In the drawings and specifications preferred embodiments of the invention have been shown, and although specific terms are employed these are used in a generic sense and not for purposes of limitation, the scope of invention being set forth in the following claims.

I claim:
1. In combination with a snap fastener comprising a stud member and a three-sided lock socket member axially insertable to locked position over the stud member, said members being releasable from locked position in response to an axial pull upon the members at the fourth side of the socket member, a flexible webbing attached to one of said members at substantially right angles to said axis, said attached webbing extending from the releasable fourth side of said socket member, an elongated bar, means including said fastener members for securing a portion of the webbing extension at least partially around said bar, means for applying tension to said webbing extension, and means responsive to said tension and including continuous complementary segments of said bar, webbing extension, and at least one of the locked sides of said socket member for shielding said releasable fourth socket side from external access radially about an axis passing through the latter side and parallel to said bar.

2. The combination as set forth in claim 1 wherein the other of said fastener members is attached to said bar.

3. The combination as set forth in claim 1 wherein the other of said fastener members is attached to said webbing extension and separated from said first-named member by a webbing loop segment.

4. The combination as set forth in claim 1 wherein said continuous complementary segments form an elongated hollow passageway extending alongside said bar.

5. The combination as set forth in claim 1 wherein said extension is wound around said bar and fastener members at least one time.

6. Apparatus for detachably connecting a flexible cover to an elongated transversely disposed support comprising: a stud member and a lock socket member axially insertable to locked position over said stud member, said members being releasable from locked position in response to an axial pull applied to said members at one side of the socket member and locked against axial separation at the opposite side, a flexible webbing attached to one of said members substantially at right angles to the axis of insertion of the latter, said attached webbing extending transversely of said axis and from said releasable side of said socket member, and means including continuous complementary segments of said support, webbing extension and locked side for forming a shield having a longitudinal axis substantially parallel to said support and surrounding said releasable socket side, whereby external access to said releasable side radially of said shield axis will be barred.

7. The combination as defined in claim 6 wherein the other of said fastener members is attached to said webbing and separated from the point of attachment of the first-named member by a length of the webbing.

References Cited
UNITED STATES PATENTS

| | | | |
|---|---|---|---|
| 415,263 | 11/1889 | Becker | 24—222 |
| 2,328,016 | 8/1943 | Huelster | 24—218 |

FOREIGN PATENTS

| | | |
|---|---|---|
| 415,642 | 7/1910 | France. |

OTHELL M. SIMPSON, *Primary Examiner.*

E. SIMONSEN, *Assistant Examiner.*